United States Patent [19]
Huwyler et al.

[11] 3,919,466
[45] Nov. 11, 1975

[54] MANUAL DIAGNOSIS EQUIPMENT FOR MOTOR VEHICLES

[75] Inventors: Franco Huwyler; Horst Engele, both of Milan, Italy

[73] Assignee: Fabbrica Italiana Magneti Marelli, S.p.A., Milan, Italy

[22] Filed: Nov. 20, 1974

[21] Appl. No.: 525,491

Related U.S. Application Data

[63] Continuation-in-part of Ser. No. 348,512, April 6, 1973, abandoned.

[30] Foreign Application Priority Data

Apr. 22, 1972 Italy .................................. 23441/72

[52] U.S. Cl. ............... 178/6.8; 73/116; 178/DIG. 1; 346/33 R
[51] Int. Cl.² .......................................... H04N 7/18
[58] Field of Search ...................... 178/6.8, DIG. 1; 235/61.9 A, 58 CF, 92 MT; 346/33 R; 73/116, 117

[56] References Cited
UNITED STATES PATENTS

| | | | |
|---|---|---|---|
| 2,393,638 | 1/1946 | Keinath | 178/DIG. 1 |
| 2,580,861 | 1/1952 | Taylor | 235/61.9 A |
| 3,194,880 | 7/1965 | Weingart | 178/DIG. 1 |
| 3,439,534 | 4/1969 | Pilgrim | 346/33 R |
| 3,725,947 | 4/1973 | Albertini | 346/33 R |

*Primary Examiner*—Howard W. Britton
*Attorney, Agent, or Firm*—Ostrolenk, Faber, Gerb & Soffen

[57] ABSTRACT

Equipment for recording diagnosis of automobile or the like machine: a card for recording information, the card having instructions for recording information and spaces for recording the information, means for moving the card, means for printing on the card, test presetting means, an electronic control for processing signals from the test presetting means, a sensor which senses the card and the code on the card and for controlling movement of the card.

8 Claims, 4 Drawing Figures

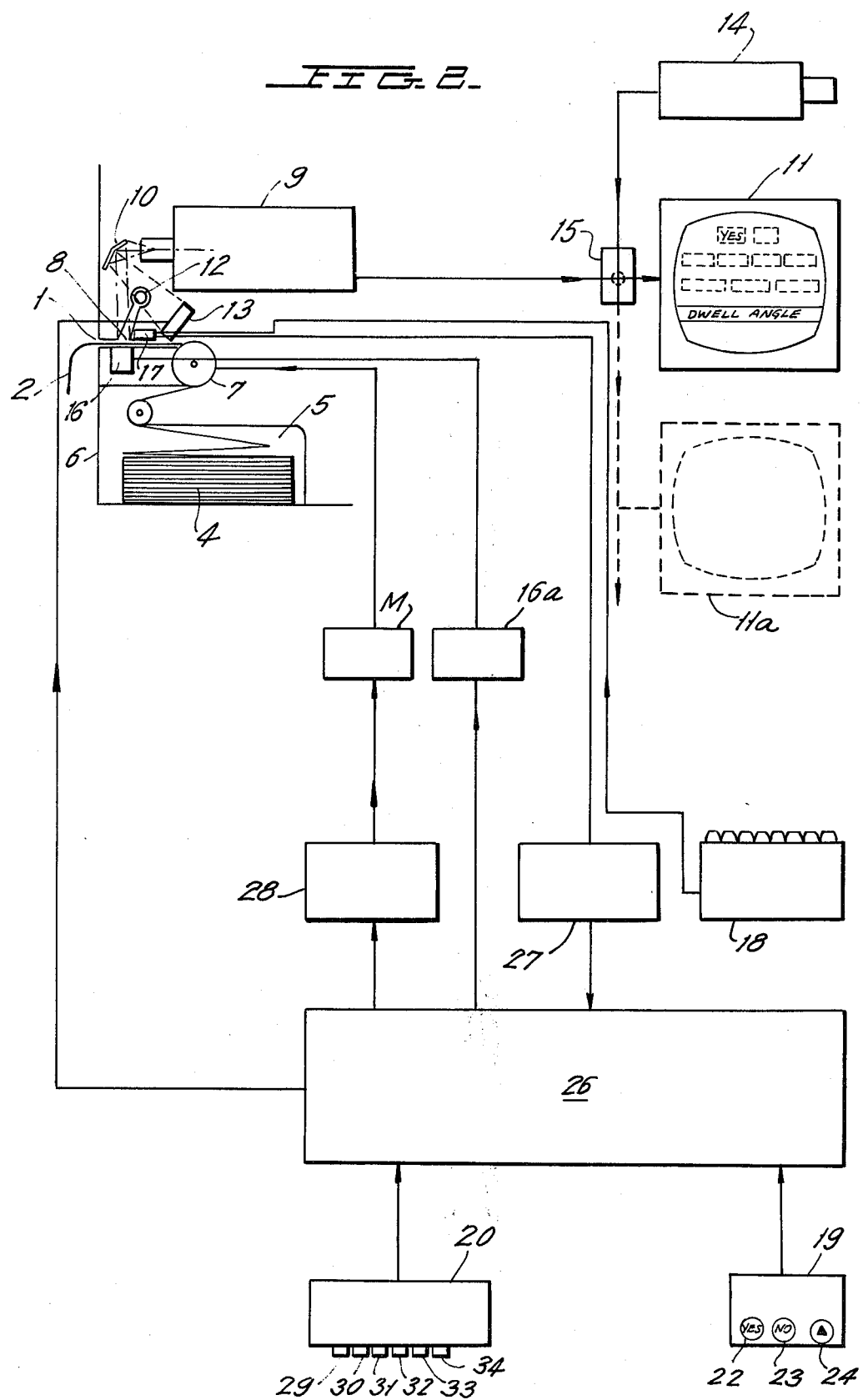

FIG. 3

| No. | TEST | RESULT | REPEAT TEST | NOTES |
|---|---|---|---|---|
| 123 | HAND BRAKE | | | |
| 124 | BRAKE FLUID | | | |
| 125 | ENGINE OIL | | | |

TEST SERVICE

VEHICLE MAKE ----
CUSTOMER ----    DATE -----
PLATE NO -----
KM. RUN -----    COUPON NO. ---

| No. | TEST | RESULT | REPEAT TEST | NOTES |
|---|---|---|---|---|
| 1 | SPARK PLUGS | | | |
| 2 | DWELL ANGLE | | | |
| 3 | COMPRESSION | | | |
| 4 | SUSPENSION | | | |
| 5 | FILTER | | | |
| 6 | TOTAL TOE | | | |
| 122 | STEERING PLAY | | | |
| 123 | HAND BRAKE | | | |
| 124 | BRAKE FLUID | | | |
| 125 | ENGINE OIL | | | |

TEST SERVICE

VEHICLE MAKE ---
CUSTOMER ----    DATE ----
PLATE NO -----
KM. RUN -----    COUPON No. ---

| No. | TEST | RESULT | REPEAT TEST | NOTE |
|---|---|---|---|---|
| 1 | SPARK PLUGS | | | |
| 2 | DWELL ANGLE | | | |
| 3 | COMPRESSION | | | |
| 4 | SUSPENSION | | | |
| 5 | FILTER | | | |
| 6 | TOTAL TOE | | | |
| 122 | STEERING PLAY | | | |
| 123 | HAND BRAKE | | | |
| 124 | BRAKE FLUID | | | |
| 125 | ENGINE OIL | | | |

TEST SERVICE

VEHICLE MAKE ----

MANUAL DIAGNOSIS EQUIPMENT FOR MOTOR VEHICLES

RELATED APPLICATIONS

This application is related to and is a continuation-in-part of copending application Ser. No. 348,512, filed Apr. 6, 1973, now abandoned.

BACKGROUND OF THE INVENTION

This invention relates to equipment for manual diagnosis in motor vehicles and is a continuation-in-part of copending application Ser. No. 348,512, filed Apr. 6, 1973, now abandoned.

At the present the manual diagnosis of motor vehicles can be carried out by using instruction cards prepared by manufacturers for each model of car.

The card is a guide means for the operator or tester and, therefore, it should be continuously referred to during tests. At the end of each operation the operator should be able to note the test result or the like.

Due to this procedure, it is possible for the operator to make a mistake. Thus, the wrong card may be used, some test results may be forgotten, mistakes may be made in noting down the results, and the test sequence followed may not be the most efficient possible sequence.

Apart from this, the manual diagnosis systems of the prior art require a large number of cards, one for each car model or type of test, which involves problems in preparing, handling and storing the individual cards. Furthermore, such systems require some time for carrying out the tests.

BRIEF DESCRIPTION OF THE INVENTION

It is the object of the present invention to provide diagnosis equipment for motor vehicles which avoids the above-mentioned drawbacks. This is achieved, according to the invention, by guided equipment using a single type of card provided with a column carrying an indication for all of the possible tests being involved, columns for jotting down the data relating to the tests, and a further column carrying the test code.

Advantageously, a card magazine is used, the cards being accommodated in the equipment as a roll or package so as to provide a continuous supply of cards.

One particular apparatus made in accordance with the invention uses a perforated tape comprising a plurality of sections which can be separated from one another by tearing on a perforated line. The headings for all of the tests that can be carried out on motor vehicles are printed on each of the sections and, at said headings, spaces are provided for notes as to a positive result (YES) or a negative result (NO) and a test code (VI).

The apparatus includes the following elements:

1. A closed circuit TV system comprising a television camera for recording the test heading and one or more monitors for displaying the heading.

2. A printer capable of printing, in the proper section space, the result of the test made, which result will also appear on the monitor or monitors.

3. An electric motor for feeding or retracting the tape.

4. Sensors for reading the section test code.

5. A selector keyboard to activate the sensors for selecting and arranging the sequence of the series of tests to be carried out, comprising a number of keys (eight keys, for example) which can be acted upon by the operator.

6. A logic unit or electronic circuit which, in accordance with the signals received from the sensors, controls the motor to position the tape at only those headings for the tests to be carried out.

7. A first push-button panel is connected to the logic unit and comprises three pushbuttons, of which two control the printer and the subsequent automatic feeding of the tape to the next test of the program as set by the keyboard. The third pushbutton controls the section return and repeats the print-in of the result (YES or NO) for the "Result Repeat" column.

8. A second push-button panel is also connected to the logic unit and comprises a number of pushbuttons for providing the functions of continuous feeding, continuous return, step-by-step feeding, step-by-step return, tape stop and apparatus tun-on.

In operation, the apparatus, in connection a given test program as selected on the keyboard, displays the heading for the first test to be carried out on the monitor or monitors. The operator, after due inspections on the motor vehicle, and with the aid of suitable meters and equipment, will cause the test result (YES or NO) to be noted on the card section and the successive automatic feeding of the tape to the display of the heading for the next test in the program. Finally, having completed the test series, the operator will detach from the tape the section carrying the test result, this section having emerged from the proper slit of the apparatus.

Note that the apparatus itself does not effect any diagnosis operations but, once the operator has set the program, it allows the display of the test headings for the tests that the operator should carry out and tells him the sequence for carrying out the tests, and requires recording of the test result before the apparatus displays the next required test heading.

BRIEF DESCRIPTION OF THE DRAWINGS

FIG. 2 is a block diagram of the equipment.

FIG. 3 shows a portion of the paper web or sheet on which the cards are printed.

DETAILED DESCRIPTION OF THE DRAWINGS

Figure 1:
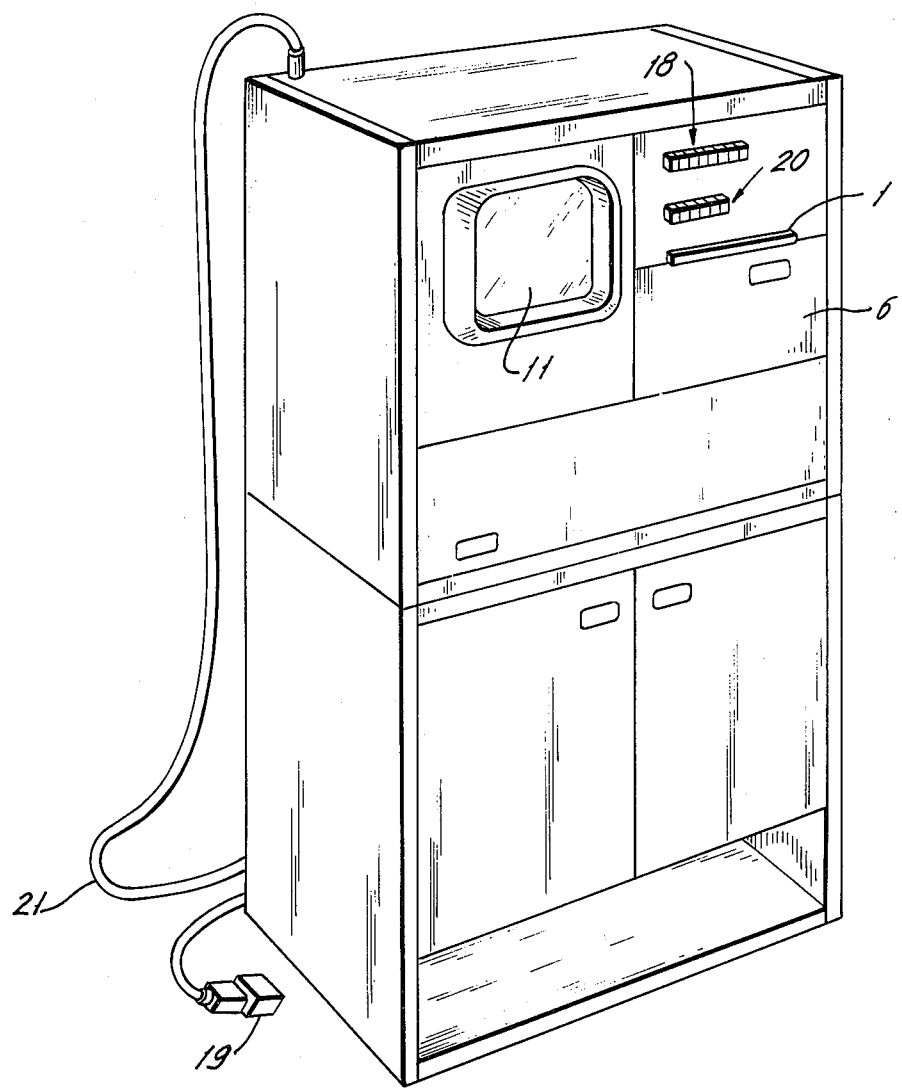
FIG. 1 shows the cabinet for the diagnosis equipment according to the invention.

Referring first to FIGS. 1 and 2, reference numeral 1 designates a slit or aperture in the cabinet for the outlet of the paper web or sheet 2, on which the cards 3 are column-printed (see FIG. 3).

Said sheet 2 is inserted as a roll or package, such as at 4, in a recess or housing 5 of the cabinet accessible through a door 6, and is dragged by a drum 7, the latter being driven by an electric motor M.

Adjacent said slit or aperture 1 an observation zone is provided, this observation zone 8 enabling to read out the title of the tests to be carried out, as shown on the card. Advantageously, the reading can be effected by means of a closed circuit television system incorporated within the cabinet, comprising a television camera 9 for shooting the title either directly or by means of mirrors 10, and a monitor 11. A lamp 12 will provide for illuminating the title. An episcope can be inserted in place of the TV camera. However, reference will be made later and always to the monitor for simplicity.

In the field of vision of the television camera 9 there is also provided a signalling board 13 carrying some indications relating to the operation of the equipment (such as program repetition, test result, paper supply, card start and end, failures, etc.,) so that such indications can also be read by the operator on motor 11.

Provision can be made also for further monitors, such as 11a, driven by the same television camera 9 and located at suitable locations for observation by a user or the like. The television circuit may be completed by a portable probe 14 of a reduced size for observing in the course of tests such car points or details not readily visible by the operator.

A switch 15 is for connecting the television camera 9 or 14 to monitor 11, 11a.

At the observation area 8 adjacent the sheet 2, a printing machine 16 is mounted for printing the result of the carried-out test on the involved card on operator's control. Also this note will appear on the monitor or monitors.

A reading device 17 is mounted adjacent the printing machine for reading a code shown on the card at the tests. This reader 17 may be an optical, magnetic or other type of reader, and comprises a number of sensitive elements.

The equipment control is provided as including a test prearranging device 18 comprising a number of pushbuttons (eight of such pushbuttons being shown in the drawing), previously operated by the operator in connection with the series of tests to be carried out, and the devices 19 and 20 which are also operated by the operator. The device 18 is connected to the device 17. The device 19 is a remote control device connected by a cable 21 to the equipment, and comprises three pushbuttons, of which two pushbuttons 22 and 23 are for controlling the printing machine 16 and subsequent automatic forward movement of the card up to the next test of the test series as set by the device 18, and the third control pushbutton 24 is for moving the card backward and enabling the test to be repeated. Pushbutton 22 is operated, for example, to print the indicated positive test result, such as by YES writing, while the pushbutton 23 is for a negative result, indicated by NO.

According to a modified embodiment, the device 19 can be connected to the equipment by means of ultrasonic or radio frequency signals. Thus, the cable 21 may be dispensed with and the operator is provided with increased freedom in his movements.

The control device 20, as inserted in the cabinet, comprises a number of pushbuttons 29 to 34 in FIG. 2 for causing such operations as: fast forward movement (pushbutton 29), fast backward movement (pushbutton 30), step-by-step forward movement (pushbutton 31), step-by-step backward movement (pushbutton 32), stop (pushbutton 33), and on-off switch (pushbutton 34). The device 20 can include the device 19. The prearranging device 18 and the control devices 19 and 20 terminate in a logical unit 26, the reading device 17 being also connected thereto through an adapter circuit 27.

The logical unit 26 processes the incoming signals and controls both the motor M through the regulation and control circuit 28 and the printing machine 16 through the electric control circuit 16a.

As above mentioned, FIG. 3 shows a portion of the paper web or sheet 2 having the cards 3 thereon, all of such cards being identical and separated from one another by a perforated tear line 29, according to which at the test end the operator provides for detaching the card at the cabinet outlet 1.

Each of the cards comprises a top portion to be filled in and identifying the model and characteristics of the car being checked, and a bottom portion divided into six columns.

The order number and the test title are printed on the first and second columns, respectively. The third column has the Test Result printed therein and the fourth column has the Repeat Test Result requirement printed therein by the printing machine 16. The fifth column is for the operator's notes and the sixth column (VI) is kept for the test selection code. It will be apparent that the printing elements of the printing machine are placed at the third and fourth column and the reading device 17 is placed at the sixth column.

FIG. 3 shows the cards just prior to tests. Upon test completion, each of the cards will have the indications "YES" or "NO" printed in the third column and if needed, the "Repeat Test" in the fourth column.

The above described equipment generally operates as follows:

The first operation to be accomplished by the operator, after closing the master switch, is the test prearrangement. To this end, the operator will depress one of the pushbuttons on the device 18 in connection with the model of the car being tested. The tests called for may be related to the model of the car, the total distance run by the car and the like. By this operation the equipment is set to present to the operator only the titles of a given test set. In order to start the tests, the operator will act on the desired movement pushbutton (20, 30, 31 or 32) of the device 20 causing the card 3 to move until the title of the first test of the preset test series appears at the observation area 8 and hence on the monitor 11. For example, should the first test be that for contact breaker (or dwell angle), the indication "Dwell Angle" would appear on monitor 11, as shown at 11 in FIG. 2.

In connection with the test shown, the operator will then provide for the required inspections on the car and then will depress the pushbutton 22 or 23 whether the test result is positive or negative.

The operation of either pushbutton causes the operation of the printing machine 16 which provides for writing on the card column "Test Result" a reading "YES" (pushbutton 22) for a positive case, and the reading "NO" (pushbutton 23) for a negative case. Either indication will also appear for a short time on monitor 11. A positive result "YES" is shown in FIG. 2.

The operation of pushbutton 22 or 23 also causes, immediately after printing is completed, the card to move forward until the title for the next test of the preset test schedule appears at the observation area 8 and hence on monitor 11.

Similarly, the operator will provide for the inspections relating to the new test and accordingly depress one of the pushbuttons 22 or 23 to jot down the result, and so on until, upon completion of the test set, the test end indication appears on the monitor. The card is now completely out of the cabinet slit 1 and can be detached by the operator according to the tear line 29.

The card constitutes a document of the test results to be used for later repair operations of the car.

By using a double card sheet, the document can be available in a dual copy.

In the course of tests, should the operator deem to omit a determined test as appeared on the monitor, the operator will depress the pushbutton 29 or 31 of the device 20, thereby causing the card to move without being printed, in the fast or step-by-step forward movement, over to the desired test displayed on the monitor 11.

Where the operator becomes aware of having depressed the incorrect pushbutton on the device 19, the operator can repeat the operation by acting on pushbutton 24 of such device.

The card, having moved to a position corresponding to the next test, is by this operation moved back to the position corresponding to the questionable test, and at the same time the printing machine 16 is preset to operate at the "Repeat Test Result" column.

The operator will then operate the correct pushbutton 22 or 23 and the printing machine 16 will print the correct result.

Following this operation, the card automatically moves back to the next position in the test sequence and the printing machine is restored to normal position at the "Test Results" column.

By depressing another pushbutton 30 on the device 20, the card can also be brought by a fast continuous motion back to the initial test position, or during this return movement the card can be arrested at a determined test by acting on stop pushbutton 31.

Whichever is the card position, by depressing the pushbutton 32, the printing machine is preset to write the readings "YES" or "NO" on the "Repeat Test Result" column, it being thereby possible to repeat the tests.

By depressing the pushbutton 33, the fast continuous forward movement of the card is controlled until the end of the card. This forward movement can be arrested at any position by operating the pushbutton 31.

The pushbutton 34 is a repetition or duplicate of pushbutton 24, in other words controlling the forward movement of the card from one test to the next test in the sequence without any operation of the printing machine.

The pushbuttons 30 and 33 for continuous fast backward and forward movement of the card control the motor M through the switching device 25.

The assembly 26 is also connected to the board for enabling the indications thereof, as displayed on the monitor 11.

From the foregoing, it will be seen that the operator is not bound to the test selection and sequence, but is guided by the equipment. Therefore, operator errors and oversights are avoided and the tests can be readily carried out. A single type of card is suitable for the diagnosis of a very large number of cars with obvious advantages in ease of use and supply.

Where cards are available as packages or rolls, it is possible to pass continuously from one set of tests relating to one car model to another set of tests, it being merely required to operate a presetting pushbutton on device 18.

Moreover, the provision of the monitor allows to display other information in addition to the described information. For example, the monitor could be used for displaying such information as relating to the carried-out tests (high voltage signal on the spark plugs, cam angle signal, compression signal, etc.) which at present are represented by a set of indication meters.

In this case, the equipment also comprises a processing device, to the input of which the signals for the various information being involved are applied, and the output of which is connected through the switch 15 to the monitor 11, whereby the latter will provide a display (parallel lines of a different length) for the value of the information.

The television camera 9 and the processing device can be concurrently connected to the monitor 11, in which case a portion of the monitor is used for displaying the above-mentioned information, while the other portion is used for displaying the information from the television camera.

In addition to emphasizing the equipment, the further use of the monitor also allows a reduction in cost and overall size of the assembly, since the commonly used plurality of indicating meters is substituted for by a single processing device of a lower cost.

Figure 4:
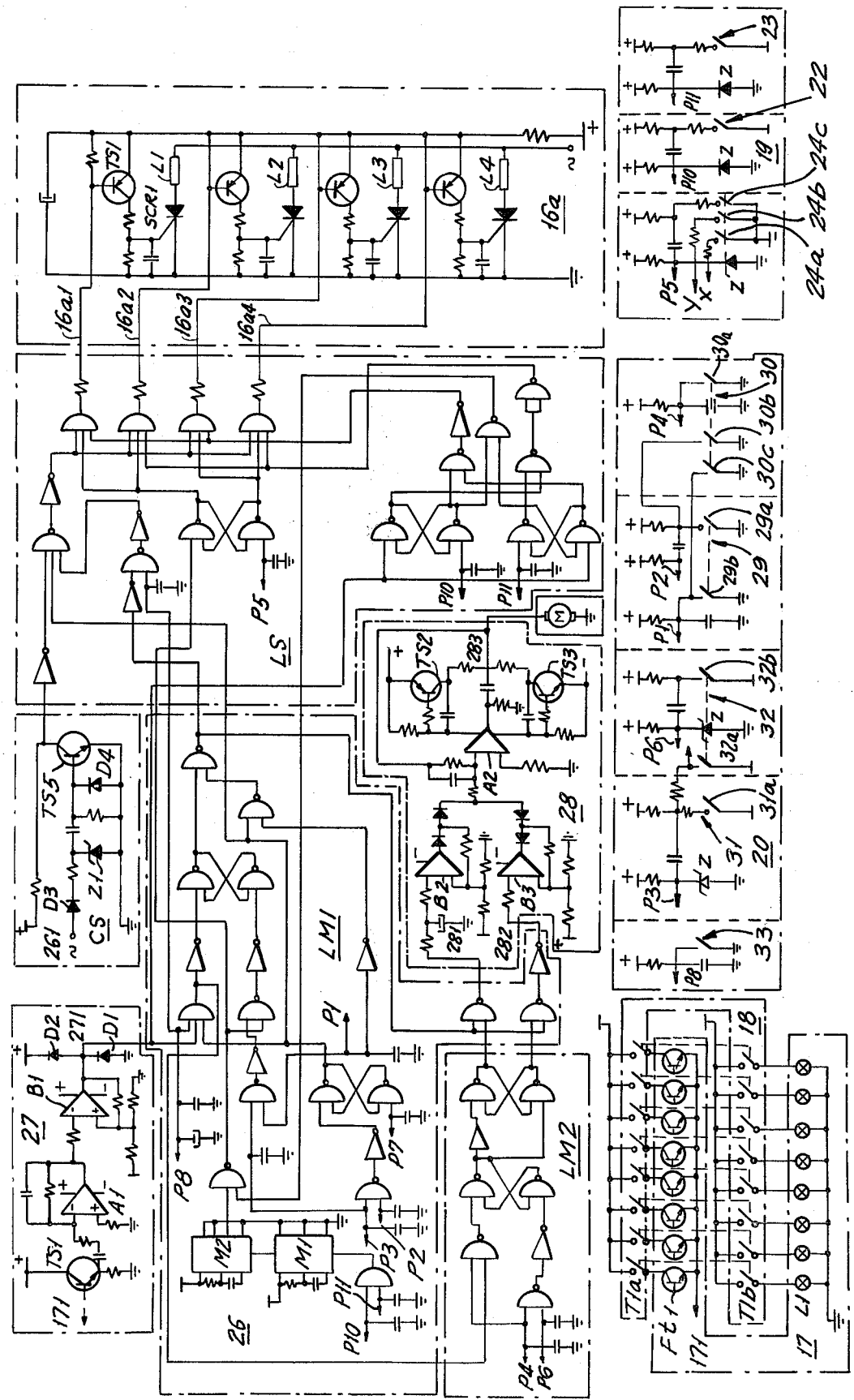
FIG. 4 is a detailed circuit diagram of the various circuit devices schematically shown in FIG. 2.

FIG. 4 is the general circuit diagram of one particular circuit which could be used in FIG. 2, and which is capable of selecting eight programs, that is, eight test runs. The blocks and members shown in FIGS. 1, 2 and 3 are designated by the same reference characters in FIG. 4. Moreover, the common connection points throughout FIG. 4 are shown in the diagram by letters P1 to P11 to avoid confusing the diagram with numerous connection lines. The component parts of the circuit of FIG. 4 are shown within respective dotted-line blocks and are as follows:

Electric motor — M

Motor M a DC electric motor controlling the movement of the sheet 2 over the drum 7 (FIG. 2). As set forth hereinafter, the motor M can be operated for fast forward and backward movement, or step-by-step forward and backward movement. The step-by-step movement corresponds to the preset program.

Test prearrange device — 18

Device 18 is a pushbutton panel (or keyboard) fitted with eight pushbuttons of the type wherein the operation of a pushbutton disconnects another possibly connected pushbutton, Each pushbutton closes a pair of contacts.

T1$a$ and T1$b$ designate the pair of contacts (such as the first of the eight pairs) controlled by pushbutton T1 (not shown).

By the operation of a pushbutton, and hence by the closure of a pair of contacts, the energization is provided for a channel of the reading device and accordingly the selection of a program.

Reading device — 17

Device 17 comprises eight sensitive elements, particularly eight phototransistors, side by side arranged at the code column (see column VI of FIG. 3).

A lamp is associated with each of the phototransistors.

The column VI of the card, as formed of black lines or segments, the arrangement of which defines the programs, runs between the phototransistors and lamps.

F$t$1 and L1 designate a phototransistor-lamp assembly, such as the first of the eight assemblies.

Operation of devices 17 and 18

By operating the pushbutton T1, corresponding to a given program, the pair of contacts T1$a$ and T1$b$ are closed, the phototransistor F*t*1 is supplied and the lamp L1 is illuminated.

Depending on whether F*t*1 is blacked out or not by the code lines, a varying current is provided at the common output 171, this current being at a minimum when the phototransistor is blacked out. The output 171 is connected to the input of the adapter circuit 27.

Obviously, when operating another pushbutton, another program will be set, since the corresponding phototransistor-lamp assembly becomes operative.

Owing to the feature of the pushbutton panel 18, the insertion of one program will cut out the other programs.

Adapter circuit — 27

Circuit 27 connects the reading device 17 to the logical circuit or unit 26. It substantially comprises a transistor TS1 which is capacitively connected to an operational amplifier A1 followed by a comparator B1 and two diodes D1, D2.

This circuit is for converting the variable signal at input 171 into pulses at output 271. Said pulses are generated whenever a black code line passes between the phototransistor and lamp. The two diodes operate to render the voltage levels for the pulses at the output 271 consistent with the logical unit 26 (TTL consistent).

Remote control device — 19

Device 19 comprises a keyboard having three independent pushbuttons. The pushbutton 22 is for YES printing, pushbutton 23 for NO printing and pushbutton 24 for repetition. The pushbuttons 22 and 23 have only one contact, while pushbutton 24 has three contacts 24*a*, 24*b* and 24*c*.

Each contact controls an R-C type of circuit, so that upon contact closing, said circuit provides at its output a pulse which is applied to the logical unit 26. In each R-C circuit a Zener diode Z is also connected for removing electrical disturbances.

The output point of the circuit controlled by button 23 is designated by P11, while P10 designates the output controlled by button 22 and points P5, P6 and P3 designate the outputs controlled by button 24. The outputs P6 and P3 are shown in the control device 20, as common to said device and circuit 19. (See reference points X and Y). The signals at the outputs P10, P11 and P5 are applied to the logical unit 26.

Control device — 20

Device 20 comprises a keyboard having six pushbuttons, but only five are shown in FIG. 4. The sixth pushbutton (see pushbutton 34 of FIG. 2) relating to the equipment on-off has been omitted in FIG. 4. The pushbutton 29 has two contacts 29*a*, 29*b* and is for the fast forward motor control. Through an R-C network, the contact 29*a* provides a pulse at output P2 whenever it is closed. The other contact 29*b* controls another circuit capable of providing at its output P1 two continuous signals of a different level depending on the contact being opened or closed.

The pushbutton 30 has three contacts 30*a*, 30*b* and 30*c* and is for fast backward movement control. The contact 30*a* controls a circuit identical to that controlled by the contact 29*b*, so that the foregoing in connection with P1 is also true for the output signal P4. The contact 30*b* is parallel connected with the contact 29*a* and the contact 30*c* is parallel connected with the contact 29*b*.

The pushbutton 31 has only one contact 31*a* and is intended to control the step-by-step forward movement.

The pushbutton 32 has two contacts 32*a* and 32*b* and is intended to control the step-by-step backward movement.

The contacts 31*a* and 32*a* are parallel connected to each other and to 24*a* of 19 (see reference X) to provide the same signal at the output P3.

The contact 32*b* is parallel connected to 24*b* of 19 (see reference point Y) to provide the same signal at the output P6.

The pushbutton 33 is the stop pushbutton and has only one contact controlling a circuit identical to that controlled by 29*b*, to provide at the output P8 a two level voltage signal.

The signals at the outputs P1, P2, P3, P4, P6 and P8 are applied to the logical unit 26.

Regulation and control circuit — 28

This circuit contains a signal process section and a power section.

The signal process section substantially comprises two comparators B2, B3 converting at the inputs 281, 282 the signals from the logical unit 26 into signals which are applied to the power section and establish the stop or motion state for the motor and the motion direction (forward or backward).

The power section comprises an amplifier including an operational amplifier A2 and two transistors TS2 and TS3. The basic diagram of this circuit can be found in the handbook Fairchild LINEAR Vol. 1, page 204.

The output 283 of this power section is connected to the motor M. The signal supplied to the motor will be a zero, or positive or negative voltage depending on whether stop, or forward or backward motion control is required.

Printer — 16

The printer 16 comprises both a mechanical and an electrical control section (16*a*).

The mechanical section substantially comprises four type bars respectively operated by four coils. Two type bars print the result YES or NO on the Test Result column (see card of FIG. 3) and the other two type bars print the result YES or No on the Repeat Test Result column. The coils are selectively energized by the electrical control section 16*a*.

As the type bars are four in number, the electrical control circuit 16*a* comprises four identical control circuits.

Each of the circuits as shown in FIG. 4 comprise a transistor, a thyristor and an R-C network for controlling the thyristor gate.

The operation of one circuit will now be described.

The signal from the logical unit 26 is applied to the input 16*a*1 corresponding to the base of the transistor TS4. By this signal said transistor TS4 is made conductive, and the R-C network generates a trigger pulse for the thyristor SCR1, the conduction of which causes the energization of coil L1, the latter controlling the YES printing type bar.

Similarly, the energization of L2, L3 and L4 will control the operation of the NO printing type bar, YES repetition type bar and NO repetition type bar, respectively.

Logical circuit or unit — 26

In FIG. 4, the logical unit 26 corresponds to the individual section labeled LM1, LM2, LS and CS.

This circuit 26 comprises a logical section for the motor control LM, a logical section for the printing machine control LS, and a synchronism section CS, said sections being interconnected.

Synchronous circuit — CS

This circuit operates to generate synchronous signals which are used in logic LS to determine the instant at which the printing is to be effected by a type bar.

This circuit comprises a rectifier diode D3, a limiting Zener Z1 followed by a timing network R-C, a clipper diode D4 and a final transistor TS5, so that an alternating signal at the input 261 is at the output of TS5 converted into square wave pulses for controlling the logical circuits.

Motor control logic — LM (LM1 + LM2)

Two blocks can be distinguished, namely LM1 and LM2, made as TTL circuits (transistor, transistor logic).

The first block LM1 is activated by the signals arriving at the inputs P1, P2, P3, P8, P10 and P11, supplied from 19 and 20, and by the signal from the output 271 of the adapter circuit 27.

The operation of the block LM1 is such that at its outputs 281 and 282, depending on the control signals applied to its inputs, the logical configurations of motor forward motion or stop will appear.

It should be noted that the signals at P10 and P11, as supplied from the device 19, are also applied to the inputs P10 and P11 of block LS. Through the timing multivibrators M1 and M2 and subsequent logical chain, these signals in block LM1 cause the occurrence on the outputs 281 and 282 of the logical forward motion configuration and, upon printing completion, the automatic feeding of the motor.

The second block LM2 is activated by the signals arriving at the inputs P4 and P6 and supplied the first from 20 and the second from 20 or 19.

The operation of block LM2 is such that at its outputs 281 and 282, depending on the control signals applied to its inputs and to those of LM1, the backward motion configuration will appear.

Printing machine control logic — LS

This block is also made of TTL circuits.

The block is activated by the signals arriving at the inputs P10, P11 and P5 and supplied by the device 19.

The operation of the block LS is such that, depending on the input control signals applied, the configurations will appear on its outputs 16a1, 16a2, 16a3 and 16a4 as corresponding in block 16a to the energization of the type bar coils L1, L2, L3 and L4, to provide YES printing, NO printing, YES repetition and NO repetition, respectively.

Description of the equipment operation

For the machine operation, an operator will act on the test presetting device 18, the remote control device 19 and the control device 20. The operator will copy the following operations:

1. Equipment starting.

This is provided by depressing the pushbutton 34 of the device 20.

2. Program selection.

This is provided by depressing one of the eight pushbuttons of the device 18. Accordingly, the corresponding reading channel of the device 17, such as Ft1 and L1, is activated.

3. Card initiation.

The operation consists of bringing the card to the test starting position, which the operator visually checks on the monitor.

Initiation is provided by depressing the fast motion pushbuttons 29 or 30, or the step-by-step motion pushbuttons 31 or 32 of the device 20.

4. Test performance.

In connection with the title of the first program test appearing on the display means (such as dwell angle test), the operator will perform on the vehicle all of the measure, control and the like operations (such as those relating to dwell) and, finally, by the remote control 19 will depress the pushbutton 22 (YES) if the test result is positive, depressing instead the pushbutton 23 (NO) if the result is negative, thus causing the result printing on the card 3 at the Test Result column and the automatic feeding of the card to the title of the next successive test. When desiring to repeat the test, the operator will depress the pushbutton 24 of 19 controlling the card return to the preceding test and simultaneously will preset to operation the YES repetition type bars and the NO repetition type bars, arranged on the Repeat Test Result column. The operator will then depress the pushbutton 22 or 23 of 19, thereby providing YES or NO printing on the Repeat test Result column and automatic feeding of the card to the title of the next successive test set by the program. For the next successive tests, the operator will repeat the operations described in the above point (4).

When, during the test, the operator desires to manually override and jump forward or backward to a particular test, he can depress either the pushbutton 31 or 32 of 20. Conversely, if he desires to quickly move forward or backward or omit a plurality of tests, the operator can depress the fast forward pushbutton 29 or the fast backward pushbutton 30. The stop pushbutton 33 stops card movement if desired, as when a card tears.

Although there has been described a preferred embodiment of this invention, many variations and modifications will now be apparent to those skilled in the art. Therefore, this invention is to be limited, not be the specific disclosure herein, but only by the appended claims.

The embodiments of the invention in which an exclusive privilege or property is claimed are defined as follows:

1. Apparatus for guiding the test of an automotive vehicle and for recording the results of tests comprising, in combination:

an elongated recording form having thereon, in serial row form, a plurality of named tests each associated with a given code indication and in column form, regions for recording test results corresponding to a given test, form moving means for longitudinally moving said form, a test result recording means operable to record a test result in a test result column on said form corresponding to a particular test;

a test sequence presetting means for presetting a desired test sequence to be performed on a given vehicle;

sensor means disposed adjacent said form and reading said code indication on said form as said form moves past said sensor means;

automatically operable control means connected to said test sequence presetting means, said test result recording means, and to said form moving means for automatically moving said form to the next test position in a given sequence of tests in response to the operation of said test result recording means.

2. The apparatus of claim 1 wherein said form is one member of a plurality of elongaged paper tickets connected to one another on severable lines and wound in roll form.

3. The apparatus of claim 1 wherein said form includes specific areas for recording given motor vehicle information.

4. The apparatus of claim 1 which further includes television type monitoring means for remotely displaying the test position of said card at any instant.

5. The apparatus of claim 4 wherein said form is one member of a plurality of elongated paper tickets connected to one another on severable lines and wound in roll form.

6. The apparatus of claim 1 which further includes manually operable control means connected to said form moving means for manually moving said form to any desired test position.

7. The apparatus of claim 6 which further includes television type monitoring means for remotely displaying the test position of said card at any instant.

8. The apparatus of claim 6 wherein said form is one member of a plurality of elongated paper tickets connected to one another on severable lines and wound in roll form.

* * * * *